July 15, 1969 — E. L. BEDELL — 3,455,373
APPARATUS FOR ULTRAHIGH PURITY PRECISION CASTING
Original Filed Jan. 6, 1966
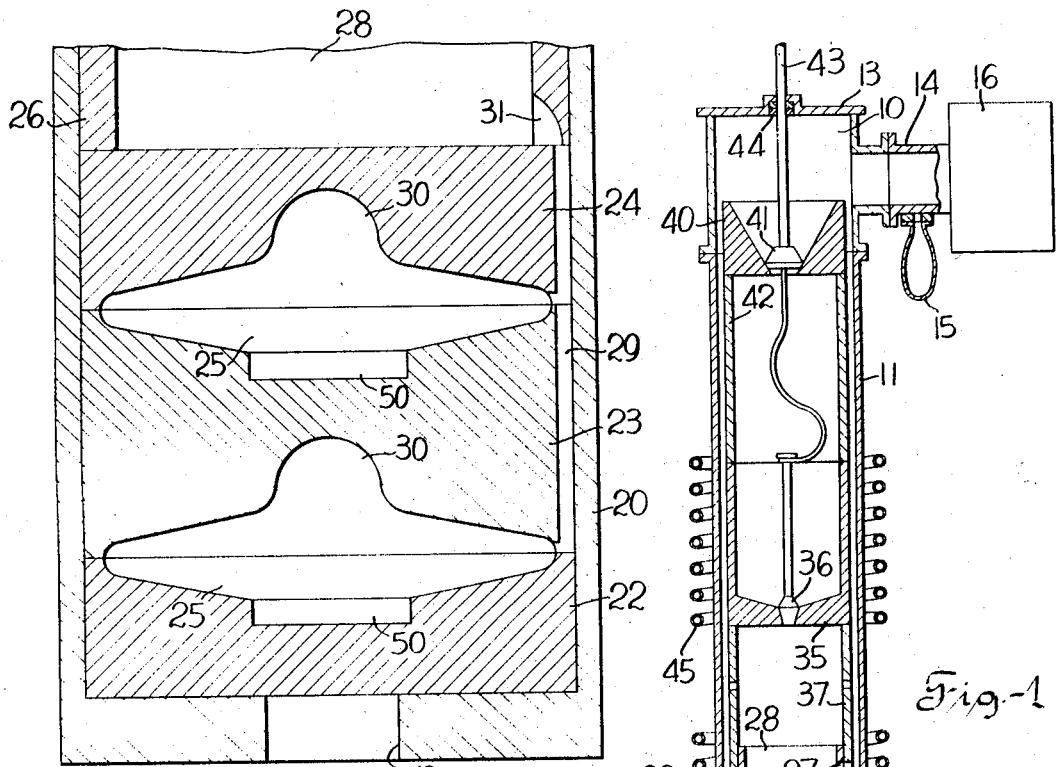
Fig.1
Fig.2
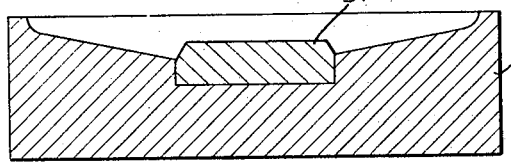
Fig.3
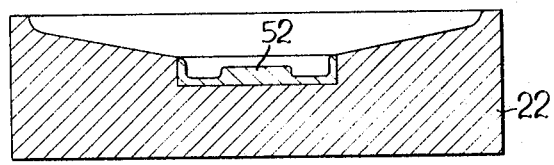
Fig.4
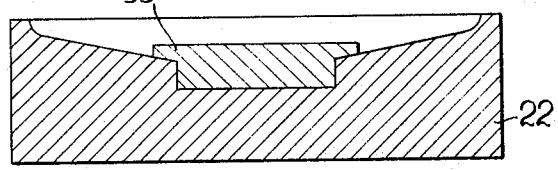
Fig.5
Inventor
Edward L. Bedell
by Forest C. Sexton
Attorneys

United States Patent Office

3,455,373
Patented July 15, 1969

3,455,373
APPARATUS FOR ULTRAHIGH PURITY PRECISION CASTING
Edward L. Bedell, Milwaukee, Wis., assignor to Allis-Chalmers Manufacturing Company, Milwaukee, Wis.
Original application Jan. 6, 1966, Ser. No. 519,133. Divided and this application Mar. 13, 1968, Ser. No. 734,183
Int. Cl. B22d 27/16; B28b 7/26
U.S. Cl. 164—258
10 Claims

ABSTRACT OF THE DISCLOSURE

The disclosed apparatus involves means for melting and casting metal in a vacuum into vertically stacked molds, each having a cavity with a blind riser, and means to cause the metal in each mold to solidify last in the blind riser.

---

This is a division of application Ser. No. 519,133, filed Jan. 6, 1966.

This invention relates generally to vacuum casting. More specifically, this invention relates to a method and apparatus for vacuum casting, in reusable graphite molds, a plurality of high purity precision metal parts whereby solidification of the cast metal is controlled to yield high purity structures.

There is a great demand today in research and industry for high purity metals and high purity precision metal castings. In many of the new sciences and industrial fields, there are numerous examples where even minute impurities have been shown to cause adverse effects in the mechanical, chemical and physical properties of otherwise relatively pure metals.

An example of the concern for purity can be found in the vacuum switch industry which requires contacts having gaseous impurity contents below about $10^{-3}$ parts per million. One reason for such high purity requirements is the fact that any impurities that are present in the contact tend to concentrate at the grain boundaries. Gaseous impurities are especially undesirable since they are released from the contacts by heat during switch operation. If sufficient gas is evolved from the contacts within the vacuum switch, the pressure therein will increase to a point at which the switch will not interrupt an electric current.

Already the literature is quite extensive on the subject of high purity metals and the methods for producing them. Perhaps the most common high purity refining method is the process known as "vacuum zone refining" or simply "zone melting." This method involves the movement of a thin molten cross section through a solid ingot of the metal to be refined, while said ingot is subjected to a high vacuum environment. Since the kinetics of zone melting are well known, they need not be greatly detailed here. It may be sufficient to say that this process depends upon the difference in solubilities of particular impurities between the liquid and solid states of the base metal. Thus, as the thin molten ingot moves across the ingot, the impurities within the ingot are concentrated in the liquid ahead of the advancing solid interface so that the impurities are literally pushed to one end of the ingot. Concurrently, the high vacuum serves to degas the melt. That is, the high vacuum environment will remove those impurities having a relatively high vapor pressure and those that form gaseous reaction products which are pumped away by the vacuum station.

Although such refining techniques are capable of producing ultrahigh purity metal in which the impurity contents are measured in parts per million or even parts per billion, the refining processes themselves do not solve all of the problems in industry's demand for high purity. Most specific application for such high purity metals, usually requires that the metal, once refined, must still be cast and even machined without any recontamination. Casting particularly becomes troublesome as the metal, once molten, can easily be contaminated by the atmosphere on the mold. To prevent such contamination, casting is most usually effected in spectrographically pure graphite molds while under a high vacuum. Although such casting techniques have solved the contamination problem, casting in a high vacuum environment greatly complicates the casting procedure leading to considerable difficulty and expense. The most serious disadvantage is that the space limitations in vacuum casting have usually limited the operation to one casting at a time. Many attempts have been made to develop techniques for producing multiple castings from one vacuum casting operation. These attempts, however, have usually resulted in processes wherein the graphite molds are not reusable. That is, the thermal contractions between a plurality of castings may actually fracture the molds, or may necessitate breaking the molds in order to extract the castings. Yet, since the machined spectrographic graphite molds are quite expensive, reusable molds are desirable for commercial applications.

This invention is predicated upon the conception and development of a new and improved method and apparatus for producing a plurality of high purity metal castings in reusable spectrographic graphite molds to greatly reduce production costs. The apparatus is designed to utilize vacuum degasing techniques and impurity crucible reactions in combination with limited zone refining in the casting procedure, while at the same time being capable of producing precision castings in a variety of configurations.

Accordingly, it is a primary object of this invention to provide a new and improved method and apparatus for producing a plurality of high purity precision metal castings.

It is another primary object of this invention to provide a method and apparatus for vacuum casting a plurality of high purity metal parts in reusable spectrographic graphite molds.

It is still another primary object of this invention to provide a method and apparatus for vacuum casting a plurality of high purity, large grained metal parts wherein the high purity is effected by vacuum degasing, crucible reactions and limited zone refining by controller solidification of the cast metal.

It is yet another primary object of this invention to provide a method and apparatus for producing a plurality of high purity precision metal castings of variable shapes, configurations and compositions while utilizing the same basic molds.

These and other objects and advantages are fulfilled by this invention as will become apparent from a full understanding of the following detailed description and accompanying drawings of which:

FIG. 1 is a sectional elevation of a high vacuum, high purity precision casting apparatus constructed in accordance with one embodiment of this invention;

FIG. 2 is a detailed sectional view of two spectrographic graphite molds as used in apparatus similar to that shown in FIG. 1; and FIGS. 3, 4 and 5 show various mold inserts as can be used to effect a variety of configurations in the castings.

The apparatus embodiment shown in the drawings, particularly the molds, is designed primarily for the casting of high purity vacuum switch contacts. The following detailed description therefore, will emphasize this particular application of the method and apparatus. Although the casting of vacuum switch contacts may perhaps be the most prominent application of this invention, it should be understood that this invention should not be limited thereto, but may be used for the production of any high purity castings.

Referring to the drawings and particularly to FIG. 1, one embodiment of the apparatus of this invention comprises a closed vessel or vacuum chamber 10 formed by an elongated, vertically disposed, tubular shaped member 11, having removable end plates 12 and 13 secured thereto. A high-vacuum pumping station 16 is provided to evacuate the chamber 10 via exhaust tube 14 in communication with the upper portion of chamber 10. The pumping station should be capable of maintaining a suitable high vacuum within chamber 10. The extent of the high vacuum will of course depend upon the specific metal being cast. For example, in the casting of copper and copper alloys for vacuum switch contact applications, the pressure within chamber 10 should be below $5 \times 10^{-5}$ mm. of mercury. The necessary vacuum level for casting other metals is within the knowledge of persons skilled in the vacuum casting art and therefore need not be detailed here. The tubular member 11 should be fabricated of a nonconductive high temperature refractory material, such as a high temperature glass, silica or ceramic impervious to gases. Some means such as an ion gauge 15 should be provided, preferably on tube 14, to measure the extent of the vacuum created within chamber 10.

A spectrographic graphite retaining yoke 20 is disposed within the vacuum chamber 10 resting upon a suitable insulating support member 21. The retaining yoke 20 primarily comprises a right circular cylindrical vessel being open at the top and provided with a knockout hole 19 through the bottom. The insulating support member 21 may be any high temperature body which will support the retaining yoke 20 well above end plate 12. Preferably, support member 21 comprises a short cylindrical quartz tube which rests upright upon end plate 12 as shown in FIG. 1.

Spectrographic graphite mold sections 22, 23 and 24 are vertically stacked within retaining yoke 20 to form a mold cavity 25 between each adjoining mold section. The mold sections 22, 23 and 24 are held tightly in place by a spectrographic graphite holddown sleeve 26, releasably secured to the retaining yoke 20 by any means such as removable pin 27. Accordingly, a spectrographic graphite heat sink reservoir 28 is formed by the holddown sleeve 26 and the upper surface of the uppermost mold section 24.

All mold sections 22, 23 and 24 and holddown sleeve 26 are machined into right circular cylindrical forms which will closely fit into the retaining yoke 20. The mold cavities, which may be of any desired configuration, are machined into the abutting flat surfaces of the cylindrical mold sections 22, 23 and 24 as shown.

For production of a single casting, one lowermost mold section 22 must be provided with a partial mold cavity in its upper surface and one uppermost mold section 24 must be provided with a partial mold cavity in its lower surface. Then, in order to produce a plurality of castings, one or more intermediate mold sections 23, with partial mold cavities in both the upper and lower surfaces, may be provided between mold sections 22 and 24.

Each mold section 23 and 24 must be provided with a down feeder or sprue which jointly interconnect the mold cavities 25 with the heat sink reservoir 28. Preferably, this is done by providing each mold section 23 and 24 with a single vertical channel or slot 29 at the outer edge thereof. These slots 29 are vertically aligned within the retaining yoke 20 to provide a down feeder or sprue between the mold sections and the retaining yoke 20. Of course, the lowermost mold section 22 need not be provided with such a slot. If necessary, the holddown sleeve 26 should also be provided with a slot or notch 31 as shown, to provide access to the sprue formed by slots 29.

The upper portion of each mold cavity 25 is provided with a blend riser 30 (FIG. 2) approximately at the center of the cavity. Since the system will be subjected to a high vacuum during casting, the molten metal will substantially fill the blind riser 30. That is to say, under a high vacuum, there will be no substantial air pockets in the mold cavity 25 to prevent the poured metal from substantially filling the blend riser 30. It is important that the blind riser 30 account for a substantial fraction of the total cavity volume, at least about 3 percent, but preferably from about 5 to 20 percent. It is also important that the upper surfaces of the cavity 25 blend smoothly into the blind riser 30 so that no protruding high points are located on the casting except the riser 30 itself.

A spectrographic graphite crucible 35 having a teeming plug 36 is disposed within the vacuum chamber 10 above the retaining yoke 20 and mold sections therein. This may be accomplished, as shown in FIG. 1, by placing a quartz tube 37 upon the retaining yoke 20 to support the crucible 35 thereabove. The crucible 35 should have a melt containment volume greater than the volume of the mold cavities 25 and the volume of the heat sink reservoir 28. The teeming plug 36 must, of course, be operable from outside the vacuum chamber 10.

As noted previously, those components which are directly contacted by the molten metal are preferably fabricated of spectrographic graphite. However, this requirement is true only for casting metals which will not wet graphite. For those metals which do wet graphite, these components should be fabricated from a different refractory composition such a zirconia. If such a material other than graphite is used, it is desirable to add a deoxidant to the melt prior to casting such as carbon, sulphur or the like.

If desired, an alloy hopper 40 and charging plug 41 may be provided within the vacuum chamber 10 supported above the crucible 35 by any means such as a quartz tube 42. As will be discussed subsequently, such an alloy hopper 40 may be desirable in alloy casting applications in which the alloy constituents cannot be jointly refined in crucible 35. If such an alloy hopper 40 is provided, the charging plug 41 must be operable from outside the vacuum chamber 10. This may easily be done by providing an elongated rod 43 which extends through the top end plate 13. A vacuum seal 44 must be provided between the rod 43 and end plate 13 so that air will not leak into chamber 10 when it is subjected to a vacuum. If desired, the teeming plug 36, on crucible 35, can then be actuated by charging plug 41 on alloy hopper 40. To do this a molybdenum or tantalum wire is interconnected between charging plug 41 and teeming plug 36, leaving sufficient slack so that charging plug 41 can be lifted without lifting the teeming plug 36.

To melt the metal charge in crucible 35, a water cooled, high frequency induction coil 45 is disposed concentrically around crucible 35. Since the principles of high frequency induction heating are well known, they need not be detailed here. Similarly, a second water cooled, high frequency induction coil 46 is concentrically disposed around retaining yoke 20 to provide a preheat for yoke 20 and the molds therein. Such a mold preheat is necessary to degas the mold and to control solidification of the castings and to assure a slow solidification rate, as will be discussed subsequently. Furthermore, the narrow sprue necessitates preheat so that the metal is not solidified therein before the mold cavities have been filled. Since the crucible 35 and retaining yoke 20 are in an evacuated chamber, little or no thermal insulation is needed. As shown in the drawing, the two induction coils 45 and 46 are disposed concentrically around tubular member 11 as well as crucible 35 and yoke 20, respectively. If preferred, the two induction coils 45 and 46 could be disposed within member 11 if suitable connections through tube 11 are provided. If the induction coils 45 and 46 are placed within chamber 10, then member 11 may be fabricated from stainless steel or the like.

In view of the proximity of the yoke 20 and molds therein to the end plate 12, it may be necessary to water cool end plate 12 so that the seal between said end plate 12 and tubular member 11 does not become overheated. This can be done by providing a tubular loop 48 in contact with end plate 12 for water flow therethrough.

In operation, the apparatus must be assembled as described above with the metal to be cast placed within crucible 35. Sufficient metal should be provided so that the cast metal will sufficiently fill the heat sink reservoir 28 as well as the mold cavities 25 therebelow. The high vacuum pumping station 16 must be activated to effect a suitable high vacuum within chamber 10, and maintain the vacuum therein throughout the entire processing and casting operations. At the same time, a high frequency alternating current and water are passed through induction coils 45 and 46 to heat crucible 35 and the molds and heat sink reservoir therebelow.

When the metal in crucible 35 becomes melted and a high vacuum is effected in chamber 10, the molten metal will be degassed and partially refined by virtue of the high vacuum environment and deoxidized by the spectrographic graphite crucible. Such high vacuum refining in a well recognized process for at least the partial purification of many molten metals, especially molten refractory metals. Specifically, partial purification will occur by the volatilization of certain impurity gases, elements and suboxides, especially those elements and suboxides having a relatively high vapor pressure as compared to the base metal. In effect, the combination of high temperature and high vacuum causes the impurities having a relatively high vapor pressure to be boiled off or driven off as gases and extracted from the system by the vacuum pumping station 16. In addition, the oxygen in the melt will react with the carbon from the graphite crucible 35 forming carbon monoxide to deoxidize the melt. Furthermore, since the system does contain a substantial quantity of graphite, the small amount of atmosphere that is present will primarily be comprised of carbon monoxide and carbon dioxide which can further purify the melt by ordinary reduction reactions. Thus, once the metal in crucible 35 becomes melted, it will be necessary to hold the melt therein for a length of time sufficient to cause the above described partial purification.

When the molten metal in crucible 35 has been vacuum refined, it is then ready for casting. It is necessary that the heat sink reservoir 28 and molds therebelow be preheated to a temperature at least equal to the temperature of the molten metal prior to casting. To cast the metal, the teeming plug 37 is lifted so that the molten metal is drained from crucible 35 into the preheated heat sink reservoir 28, where a portion of the melt feeds into the preheated mold cavities 25 through the sprue formed by slots 29 against retaining yoke 20. When all the metal has been teemed, the mold cavities 25 and heat sink reservoir 28 should be substantially filled with the molten metal. The power to the two induction coils 45 and 46 is then shut off and the system is allowed to cool slowly.

It is important that a substantial amount of molten metal remain within the heat sink 28 while the metal in the mold cavities 25 is solidifying to control the solidification of the castings in the mold cavities. The volume of the heat sink metal should be at least 20 percent of the total mold volume, and preferably between 30 and 50 percent. By maintaining the heat sink above the molds, the castings will solidify from the bottom and outside toward the top and inside, to further purify the castings by zone refining. Thus, as the slowly advancing solid-liquid interface advances from the bottom and outside of the casting, the impurities are pushed toward the top and inside to finally solidify within the blind riser 30. Subsequently, after the castings have been extracted from the molds, the riser is machined off to remove the impurities therewith. The importance of the cavity design and blind riser design should be apparent. Thus, as noted previously, the blind riser 30 should be so designed into the mold cavity 25 as will permit the advancing solid-liquid interface to move without obstruction from the lower and outer portions of the cavity 25 and terminate completely within the blind riser 30. The advancing interface should not be permitted to terminate within a portion of the mold cavity that will be retained as a part of the finished casting. Accordingly, each casting is individually zone refined as it solidifies within the mold cavity.

It is equally important that the castings cool slowly so that large grained castings result. This is because some of the impurity constituents will be partially concentrated at grain boundaries as adjacent grains solidify and advance into each other. That is, as each individual grain front advances into the liquid, the impurities are pushed therebefore as described previously. Then when neighboring grains intersect at a common interface, some of the impurity constituents are concentrated at this boundary. Therefore, if the castings are allowed to cool rather slowly, larger grains will be formed, resulting in fewer grain boundaries. With fewer grain boundaries, a greater proportion of the impurity constituents will be advanced into the removable blind riser 30. Furthermore, slow cooling will confine all shrink cavities to the upper surfaces of the blind riser metal.

After the castings and the heat sink have solidified and cooled completely, the vacuum pumping station 16 can be turned off, and air admitted into chamber 10. Thus the entire mold assembly can be removed from the chamber 10 by removing either end cap 12 or 13. To extract the castings from the mold assembly, pin 27, holding sleeve 26 within retaining yoke 20, must first be removed. Then a rod or narrow cylinder (not shown) can be used to push the sections 22, 23 and 24, the castings, the heat sink, and sleeve 26 from the retaining yoke 20 via the knockout hole 19. Since only a thin single sprue 29 was provided at the periphery of mold sections 23 and 24, any thermal contraction in the cast metal will not fracture the molds. Furthermore, the sprue metal can easily be bent to remove all mold sections 23 and 24 from between the castings and heat sink for subsequent reuse. The heat sink and sprue metal can then be cut or broken free from the castings and reused in subsequent casting operations. The castings themselves should have the blind riser metal machined off and finished to yield a high purity finished casting.

In some high purity applications, as previously mentioned, it is desirable to alloy a different metal with the base metal to be cast. If both or all alloy constituents are refractory in nature, they can be melted and refined jointly in crucible 35. However, if one or more of the alloy constituents has a realtively high vapor pressure it should not be directly melted in crucible 35 with the refractory base metal since the high vacuum environment would cause the additive to be volatilized, thus purifying the refractory base metal and defeating the main objective. In such situations, the relatively volatile metal alloy addition, should not be added to the melt until just prior to casting. To do this, the relatively nonvolatile base metal can be melted in crucible 35 as described above. The volative alloy should be placed in alloy hopper 40 where it will remain relatively cool and solid while the base metal is being melted and vacuum refined therebelow. Just before casting, charging plug 41 should be pulled allowing the alloy metal to fall into the base metal melt in crucible 35. Then, as soon as the alloy metal has become melted and mixed, the entire alloy is cast as described above.

In vacuum casting, it is desirable to have some degee of flexibility in the configuration of the casting itself. This is especially true in the casting of vacuum switch contacts where different compositions and geometrics of the contact tip are desired for different applications. Specifically, the contacts all have a similar disk shaped outer periphery called a "swirl," as can be seen from the mold cavities 25 in the accompanying drawings. The desired contact tip surface, however, may be varied substantially. The casting apparatus and procedure as described herein lends itself nicely to alternative arrangements in order to alter the contact tip. For example, the mold sections 22, 23 and 24, as shown in FIG. 2, would produce a single pair of contact castings having a flat protruding contact tip extending beyond the swirl which would be formed by the metal in the tip cavity 50. However, the geometry and configuration of the contact tip can easily be altered without changing the basic mold sections 22, 23 and 24, by simply providing variable tip inserts which are insertable into tip cavities 50 prior to casting. For example, in some vacuum switch applications, it is desirable to provide contacts consisting of two dissimilar metals, such as a main body or "swirl" of copper and a contact tip of tungsten or molybdenum or alloys thereof. Therefore, by providing a socket forming graphite insert 51 (FIG. 3) within the tip cavity 50, a casting can be made having a socket thereon to which a preformed contact tip of tungsten, molybdenum or the like can be brazed. If desired, the casting can be formed directly over a preformed metal tip by inserting such a tip 53 (FIG. 5) into the tip cavity 50 prior to casting. The when the cast metal solidifies in the mold cavity, it virtually welds or fuses itself to the dissimilar, preformed contact tip 53. This will eliminate the need for subsequently having to braze the contact tip onto the casting. It is obvious that other contact tip configurations could be easily effected by appropriate tip inserts. For example, tip insert 52 (FIG. 4) would provide a one piece casting having an annular shaped contact tip.

As has been noted previously, the crux of this invention resides primarily in the design of the mold cavity 25 to incorporate a blind riser 30 in combination with the heat sink to effect a controlled solidification so that the castings are self-refining through the mechanism of zone refining. In addition to the unique self-refining feature, other novel and advantageous features are incorporated into this invention. For example, the stacked characteristic of the mold sections in combination with the single sprue at the side thereof permits the pouring of multiple castings without the necessity for destroying or damaging the mold sections. Further, the single sprue at the side also lends flexibility to the system without changing the basic mold sections since various mold inserts, as discussed above, can be incorporated therewith without interferring with the efficient metal feeding of the molds. It should also be noted that the bulk metal to be processed need not be of high purity prior to casting since the melting, holding and casting operation itself will effect the desired high purity in the casting.

It should be apparent that numerous modifications and additional features could be made and incorporated into the embodiment detailed above without departing from the basic concepts of this invention. For example, other methods of controlling the solidification of the castings have been used and proven effective. In one such method, the induction coil 46 is axially movable with respect to the mold cavities, to eliminate the need for a molten metal heat sink. In such an embodiment, the induction coil 46 is left "on" after the metal is poured, and then slowly moved upward with respect to the molds so that the desired solidification is effected. Satisfactory results have been obtained by moving the induction coil 46 upward at rates of less than two inches per hour.

Accordingly, it should be understood that this invention should not be limited to the details given herein, but may be modified within the scope of the appended claims.

The embodiments of the invention in which an exclusive property or privilege is claimed are defined as follows:

1. Apparatus for the vacuum casting of a plurality of high purity precision metal parts comprising in combination means for melting the metal to be cast in a crucible within a high vacuum environment, means for casting the molten metal into a plurality of preheated, vertically oriented, interconnected mold cavities subjected to said high vacuum environment, each of said mold cavities having a blind riser therein extending upward from the upper mold surface, and means for controlling the solidification of the cast metal within each said mold cavity so that the advancing solid-liquid interface progresses slowly without obstruction from the lower and outer portions of the mold cavity and terminates completely within said blind riser.

2. Apparatus for the vacuum casting of a plurality of high purity precision metal parts comprising in combination a plurality of graphite mold sections vertically disposed within a high vacuum environment forming a plurality of interconnected mold cavities therebetween, each of said mold cavities having a blind riser therein extending upward from the upper mold cavity surface, means for melting the metal to be cast within said high vacuum environment, means for preheating the mold sections, means for casting the molten metal into said mold cavities, and means for controlling the solidification of the cast metal within each mold cavity so that the solid-liquid interface advances slowly without obstruction from the lower and outer portions of the mold cavity and terminating completely within said blind riser.

3. The vacuum casting apparatus as described in claim 1 wherein said plurality of mold sections form a single mold cavity for the production of a single high purity precision metal part.

4. The vacuum casting apparatus as described in claim 1 wherein said means for controlling the solidification of the cast metal comprises a heat sink reservoir disposed within the high vacuum environment immediately above the mold sections and interconnected therewith which will contain a substantial volume of the cast metal, and means for preheating the heat sink reservoir prior to casting.

5. The vacuum casting apparatus as described in claim 1 wherein said mold cavities are interconnected by a sprue formed between the retaining yoke and the mold sections by aligned vertical slots on all but the lowermost mold section, said slots communicating with the outer edge of said mold cavities.

6. The vacuum casting apparatus as described in claim 1 further comprising an alloy hopper disposed within said closed vessel above said melting means, and means thereon for pouring the contents of said alloy hopper into said melting means.

7. The vacuum casting apparatus as described in claim 1 further comprising a mold insert removably disposed within each of said mold cavities to alter the geometry of the resultant castings.

8. The vacuum casting apparatus as described in claim 1 further comprising a metallic insert disposed within each of said mold cavities to be fused to the resultant casting.

9. The vacuum casting apparatus as described in claim 2 wherein said means for preheating said mold sections and heat sink reservoir comprises an induction coil concentrically disposed around said mold sections and said heat sink reservoir.

10. The vacuum casting apparatus as described in claim 3 wherein said induction coil is vertically movable with respect to said mold sections so that said induction coil may be moved slowly upward to more closely control the desired solidification.

References Cited

UNITED STATES PATENTS

| | | | |
|---|---|---|---|
| 741,460 | 10/1903 | Chantraine | 249—126 |
| 818,941 | 4/1906 | Dodge | 164—360 |
| 1,359,196 | 11/1920 | Rau | 249—126 |
| 2,127,239 | 8/1938 | Stoody | 249—126 |
| 2,205,327 | 6/1940 | Williams | 164—360 |
| 2,578,407 | 12/1951 | Ebling | 164—129 X |
| 2,908,054 | 10/1959 | Wilkins | 164—255 |
| 3,283,376 | 11/1966 | Hockin | 164—129 |
| 3,314,116 | 4/1967 | Wittmoser et al. | 164—360 |
| 3,402,754 | 9/1968 | Christian | 164—61 |

FOREIGN PATENTS

| | | |
|---|---|---|
| 999,604 | 7/1965 | Great Britain. |

J. SPENCER OVERHOLSER, Primary Examiner

V. RISING, Assistant Examiner

U.S. Cl. X.R.

164—41, 69, 98, 122, 138, 251, 337, 338, 360; 249—126